May 5, 1931. W. O. CROSSLEY 1,804,248

MITERING GAUGE

Filed Nov. 27, 1929

William Oscar Crossley
INVENTOR

BY Victor J. Evans
ATTORNEY

Patented May 5, 1931

1,804,248

UNITED STATES PATENT OFFICE

WILLIAM O. CROSSLEY, OF TOLEDO, OHIO

MITERING GAUGE

Application filed November 27, 1929. Serial No. 410,181.

This invention relates to improvements in miter gauges for use in connection with shaving machines for cutting printers' borders and the primary object of the invention is to provide a miter gauge so constructed that composite borders, or in other words, borders comprising monotype and linotype strips, and likewise material used in connection with the strips to provide for relative spacing of the same, and thus provide for impression of spaced border lines without the necessity of performing this work by hand, and thus eliminating the errors which are liable to be made where strips of different pica are to be cut, and it is necessary to calculate, with great accuracy, the cuts to be made.

Another object of the invention is to provide a miter gauge for use in cutting the strips of a printer's border, simultaneously in groups, so that, where the border is for example to be twenty picas square, four groups may be mitered without any readjustment of the mitering gauge for each cut, and, if a rectangular border is to be cut, two groups may successively be cut with one adjustment of the miter gauge, and the remaining two groups cut by a second adjustment of the miter gauge. This provides for mitering of a graduated size of several types of strips, simultaneously, and so that the groups of each, when assembled, will form a perfect rectangle or square.

Another object of the invention is to provide a gauge of the class described by the use of which several strips of linotype or monotype border, or a combination of the two may be mitered face up.

Another object of the invention is to provide a miter gauge by the use of which an assemblage of strips may be cut, simultaneously, with extreme accuracy and without likelihood of any errors being made.

Another object of the invention is to provide a gauge of the class described by the use of which the point system of calculating is eliminated and the necessary measurements of cuts are made by the mechanical mechanism, thus avoiding possible waste through improper cutting of the material.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawings wherein like characters denote like or corresponding parts throughout the several views, and in which:—

Figure 1:
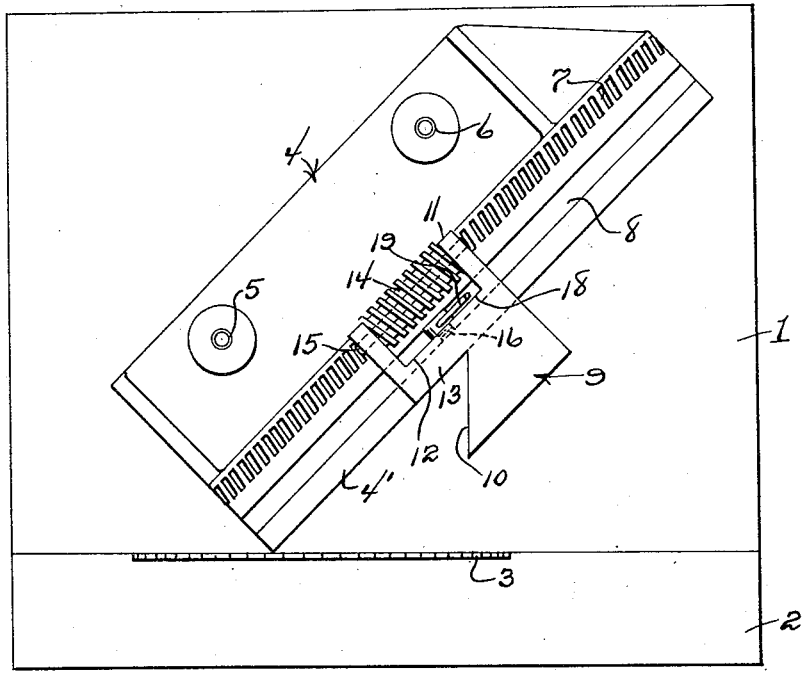
Figure 1 is a plan view illustrating the miter gauge, embodying the invention, mounted upon the sliding saw table of a miter machine and illustrating the position of the gauge with respect to the saw and to the fixed or stationary saw table.
Figure 2:
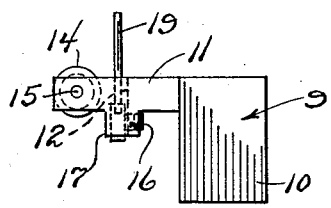
Figure 2 is a view in end elevation of the miter head of the gauge embodying the invention.
Figure 3:
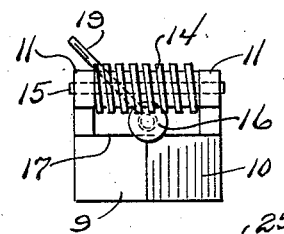
Figure 3 is a side elevation of the miter head of the gauge.

In the drawing the numeral 1 indicates the sliding saw table of a sawing machine, and the numeral 2 a stationary saw table, the mitering saw being indicated by the numeral 3. The gauge comprises a base member which is indicated in general by the numeral 4 and this base member which is preferably in the nature of a casting is mounted upon the table 1 by a pivot screw 5 connected to the table 1 and held in positions of adjustment about the pivot screw 5, by a lock pin, which is indicated by the numeral 6.

The body 4, at one side is provided with a thickened portion having a plane or right line face 4' against which the material to be mitered may be disposed, and in the upper face of this portion there are formed a series of grooves 7 of the form of one section of a helical screw thread, and a groove 8 is formed longitudinally in the said upper face of the extension and parallel to the series of thread grooves 7.

The gauge head is indicated in general by the numeral 9 and the same comprises a body which is of trapezoidal form, one inclined side of which is indicated by the numeral 10 and is presented at an acute angle to the forward face of the extension or thickened portion of the base 4. From the narrow side of the body of the head 9 there extends a portion 11 which is recessed at its outer side as indicated by the numeral 12 and this portion has a substantially flat under side, which is designed to rest upon the upper side of the thickened portion of the base 4. A portion 13 of the extension 11 being located in confronting relation to the inclined side 10 of the head 9.

Within the recess 12 there is mounted an exteriorly threaded sleeve 14, a shaft 15 extending thru the sleeve and being journalled in its ends at the portions of the extension which constitutes the end walls of the recess. The threads of this sleeve engage, at the under side of the sleeve, in the thread grooves 7 and it will be understood that by rotating the sleeve, the gauge may be moved longitudinally along the base so as to determine the distance between the face 10 of the gauge head and the saw blade.

In order that the gauge head 9, may be held in the different positions to which it may be adjusted in the length of the base, a set screw 16 is threaded thru a boss 17 extending downwardly from the part 13, and the inner side of which boss opposes the relatively adjacent side of the gauge head 9, which in turn, as previously stated, engages against the forward side of the base 4, the said boss 17 engaging slidably in the groove or channel 8, and the inner wall of the recess 12 being cut away as indicated by the numeral 18, so as to accommodate the head of the set screw 16. A finger piece 19 extends from the head of the set screw into the cut away portion 18 and the movement of the finger piece is limited by its engagement with the end walls of the said cut away portion 18.

Figure 4:
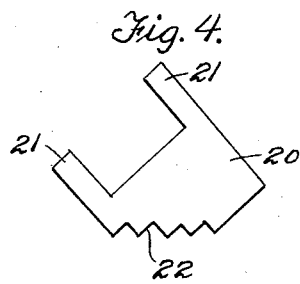
Figure 4 is a plan view of a modified form of miter head for use in simultaneously cutting a plurality of border pieces.

Figure 4 illustrates a miter head which may be employed for cutting a plurality of border pieces, simultaneously, and in this figure the head is indicated by the numeral 20 and the portions thereof which correspond to the portions 11 of the previously described embodiment are indicated by the numeral 21. The face of this head which corresponds to the face 10 of the head 9 of the previously described embodiment is formed with a plurality of notches 22 having their walls at right angles to each other, and, in the use of this head, the ends of the miter pieces, to be mitered are disposed in respective ones of these notches.

Figure 5:
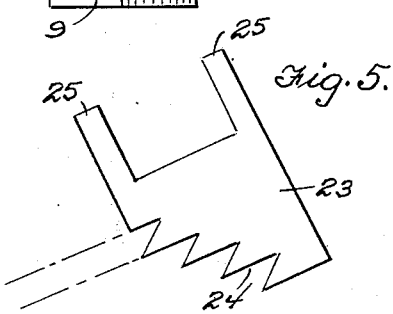
Figure 5 is a plan view of a miter head for use in simultaneously cutting a plurality of groups of border pieces of the same length.

In the embodiment of the invention shown in Figure 5, the head, which is indicated by the numeral 23, is formed, in its angular face with a plurality of notches 24 which are of the form shown in this figure of any other angular formation desired. In this figure the extensions corresponding to the extensions 11 and 21 of the embodiments shown in Figures 1 and 4, are indicated by the numeral 25, and in any, or all, of the forms, these extensions may be altered in any manner to permit the head to be used in connection with any and all types of mitering machines, where possible.

What I claim is:—

A mitering gauge comprising an elongated base pivoted adjacent one end to the movable table of a sawing machine with one end arranged adjacent the saw of the machine, means to hold the base in adjusted positions on the table, said base having a thickened portion at one side providing a plane work face against which the material to be mitered may be placed and having a groove extending parallel and in spaced relation to said face, feed teeth formed on the thickened portion of the base adjacent the groove, a gauge body of trapezoidal shape having one side inclined and disposed at an acute angle to said work face of the thickened portion of the base and providing a narrow side to the body, a bifurcated portion formed on the narrow side of the body and providing spaced arms traversing the groove and feed teeth and resting on the upper face of said thickened portion of the base, a feed nut journalled to the arms and meshing with the teeth to permit adjustment of the body along the work face and toward and from the saw, a boss on the bifurcated portion and extending into the groove, a headed set bolt threaded to said boss and located between the opposing walls of the groove, and a handle secured to the headed set bolt for turning the latter against the wall of the groove lying adjacent the work face of the base to clamp the body in various adjusted positions.

In testimony whereof I affix my signature.

WILLIAM O. CROSSLEY.